COLOR TELEVISION SYSTEM UTILIZING PHASE-DIFFERENCE MODULATION

Filed July 6, 1966 7 Sheets-Sheet 1

March 24, 1970 V. E. TESLER 3,502,794

COLOR TELEVISION SYSTEM UTILIZING PHASE-DIFFERENCE MODULATION

Filed July 6, 1966 7 Sheets-Sheet 7

3,502,794
COLOR TELEVISION SYSTEM UTILIZING PHASE-DIFFERENCE MODULATION

Vladimir Efimovich Tesler, Ulitsa Shukhova, 8, kv. 2, Moscow, U.S.S.R.

Filed July 6, 1966, Ser. No. 563,212
Claims priority, application Switzerland, July 27, 1965, 10,511/65
Int. Cl. H04n 1/46
U.S. Cl. 178—5.2 6 Claims

ABSTRACT OF THE DISCLOSURE

A compatible color television system relating to such color television systems in which information on color is transmitted by means of the balanced amplitude modulation of a subcarrier which shares the frequency band of the luminance signal.

A characteristic feature of the proposed system lies in that the phase-difference modulation of the sub-carrier is used for transmitting information on color hue.

The employment of the phase-difference modulation of the subcarrier makes it possible to avoid color distortions in the picture when there appear phase distortions in the communication channel and to preserve, at the same time, the positive properties of the balanced modulation, i.e., adequate compatibility and high noise resistance of the chrominance signal.

The present invention relates to color television systems employing a modulation of the chrominance subcarrier which shares the luminance frequency band.

In compatible color television systems now in use, various methods of modulation (encoding) and demodulation (decoding) of the subcarrier by chrominance signals are employed for transmitting chrominance information. Various methods of subcarrier modulation are used for meeting the requirements relating to the composite color television signal when transmitting the same over a communication channel and when storing television programs. These requirements include preservation of proper color rendering in case of spurious phase modulation of the chrominance subcarrier signal; high noise stability of the chrominance signal; adequate compatibility (small visibility of the interfering subcarrier pattern on the monochrome receiver screen when receiving color television signals); maximum utilization of the communication channel for transmitting all the necessary information; maximum possible simplification of the chrominance circuits (decoding of the subcarrier signal) in the receiver.

None of the now existing color television systems can simultaneously meet all the requirements enumerated above. Most noise-proof appears to be the balanced quadrature modulation of the subcarrier by chrominance signals.

In hitherto known simultaneous color subcarrier systems with the balanced quadrature modulation of the subcarrier, a special synchronization signal is incorporated into the composite signal which is a chrominance sync burst comprising 10 to 12 oscillations of the reference subcarrier in the zero phase transmitted during the horizontal blanking pulse. Separated in the receiving device, the sync burst is used to synchronize the subcarrier piezoelectric oscillator (the heterodyne), whose oscillations together with the chrominance signal (the subcarrier modulated in quadrature) is fed to phase detectors in which the modulating signals are separated.

Thus the signals fed to the phase detector are substantially different not only in their composition, but also in those stray phase distortions which they have undergone while the color television composite signal has been passing through the communications channel.

The chrominance subcarrier signal, in a general case, has a wide frequency spectrum of the order of three megacycles per second (both modulation frequency bands) and a nonuniformity of the phase characteristic of the channel in this signal frequency band, e.g., when suppressing one sideband, results in a stray phase modulation of the subcarrier. At the same time, the signal from the chrominance heterodyne which is synchronized by the sync burst which has passed through the narrow-band separation channel in the receiving device (inertia synchronization) is practically completely free of any stray phase modulation.

The chrominance subcarrier signal which occupies different levels of the luminance signal is subject to so-called differential-phase distortions when stray phase shifts of the subcarrier depend on the composite signal level (the communication channel being a quadripole with a nonlinear reactive impedance which depends on the level of the input signal). Therefore the sync burst is always on a constant level of the "black" in the signal and, hence, its differential-phase shift is, in a general case, different from that of the chrominance subcarrier signal.

Thus, at the output of synchronous detectors, there appear signals which are proportional not only to the useful but also to the stray phase modulation of the chrominance signal with respect to the reference subcarrier signal.

Therefore, one of the systems with the quadrature modulation does not meet the two basic requirements, viz., the insensitivity of subcarrier signals to stray phase modulation in the channel and maximum utilization of the channel for transmitting only useful information (since the second modulation sideband carries no information as compared with the first one and the second modulation sideband cannot be suppressed due to a stray phase modulation of the subcarrier).

Besides, the receiver of the system being described is complicated in servicing because of the necessity in two additional operation adjustments, namely, "color hue" (chromaticity) and "saturation."

In another color television system, the method of shaping a composite chrominance signal by means of the quadrature modulation of the subcarrier and the sync burst transmission is the same as in that described above and therefore all the respective chrominance circuits in the receiver are preserved (the quartz-stabilized heterodyne of the subcarrier in particular). To diminish the sensitivity of the chrominance subcarrier signal to stray phase modulation, a method of statistical error correction is used (a method of statistical accumulation). An additional phase modulation of the chrominance subcarrier signal from line to line is introduced for this purpose at the transmitting end and, correspondingly, additional devices are incorporated in the receiver, namely a statistical accumulator of the chrominance signal made as a delay line for one line time with stages for algebraic summation of delayed and nondelayed signals, and also an electronic commutator to remove an additional phase modulation of the signal from line to line (a polarity reversal of one of the modulating signals).

Since in this system a statistical error correction method is used, the results of stray phase modulation are not completely eliminated (chromaticity distortions turning into saturation distortions) while in the receiver new circuits in the chromaticity unit are to be added as compared with the above system, said additional circuits being the more complicated the better is the correction of errors arising in the presence of stray phase modulation in the channel. All this results in the chrominance unit of the receiver being the most complicated among those used in the present state color television systems.

In the third color television system known in the art the two necessary chrominance signals are transmitted alternately in an interlaced manner with the use of the frequency modulation of the subcarrier. In the receiving device a delay line with a line period (a circuit store a previously transmitted signal) and two frequency discriminators are employed. Due to the employment of the memory device, both necessary chrominance signals are present in the receiver simultaneously, one as a delayed signal at the output of the delay line and another as a nondelayed signal at the input thereof. Thus in this system only one half of the chrominance information is transmitted, as compared with the first system, and each of the two signals, due to the memory device, acts during the time of two lines. The absence of the simultaneous transmission of two chrominance signals in this system makes it possible to avoid their intermodulation distortions, and besides that, the frequency modulation is less sensitive to phase distortions in the channel, with the exception of such cases when the chrominance subcarrier signal lies on sharp transition portions of the luminance signal and the stray difference-phase modulation passes into the stray frequency modulation. Such a signal is least sensitive also to the amplitude-frequency characteristics since in the receiving device the amplitude of the frequency-modulated signal is limited.

Such a system however, also has several disadvantages, these being a smaller noise stability of the frequency-modulated subcarrier than it is the case with the quadrature-modulated signal, this feature being especially pronounced at small signal levels (at signal-to-noise ratios close to the threshold values); the signal in the presence of noises becomes more sensitive to distortions of the amplitude-frequency characteristic. (If the ratio of the signal of the subcarrier attenuated by the amplitude-frequency characteristic of the channel to noise happens to be equal to or even less than the threshold value of 6 db, no correction at the receiving end is principally possible); and also a sensitivity to the suppression of one modulation sideband.

It is an object of the present invention to eliminate the above disadvantages by the provision of a color television system in which distortions of the color of video signals in case of a spurious phase modulation of the chrominance subcarrier signal in the communication channel are eliminated while preserving the noise stability of this signal and without adding any additional complications in the receiver design.

In accordance with the invention said object is achieved due to the fact that the information on the chrominance signal is shaped in the encoding device of the transmitter and then transmitted by means of the phase-difference balanced quadrature modulation of the chrominance subcarrier in successive lines, with the laws of amplitude modulation in both lines being analogous and the phase modulations being different, and the phase of the subcarrier in one line being the reference one for shaping the chrominance subcarrier signal in the other line, the separation of the chrominance information in the receiver being effected by means of storage of the chrominance subcarrier signal which has arrived in the preceding line with the help of a delay line and detecting a phase difference between the delayed and nondelayed voltages of the subcarrier.

In the herein proposed system for transmission and reception of color television pictures the shaping of the chrominance subcarrier signal can be effected by one of the two main methods.

In accordance with one of these methods, a phase-difference interlace modulation is effected when the phase values of the subcarrier in adjacent lines which are transmitted in succession are different, their difference corresponding to the variation in the color hue (or chrominance) along the scanning line, while the method of the interlacing amplitude modulation of the subcarrier is the same. The phase-difference interlacing modulation of the subcarrier can be effected in various ways. One of such ways is a time interlacing phase-difference modulation of the subcarrier with the phase of the subcarrier in one line being "constant." In this case in one line there is transmitted a subcarrier modulated both in amplitude and in phase (balanced quadrature modulation) the amplitude of the subcarrier being equal to the modulus of the geometrical sum of the amplitudes of modulating signals taken with certain coefficients, say, of color-difference signals $K_1 E_{R-y}$ and $K_2 E_{B-y}$, and the instantaneous value of the subcarrier phase is equal to the arctan of their ratio. In the following line there is transmitted only the amplitude-modulated subcarrier, so that the amplitude modulation envelopes in both lines (the word "line" is generally to be understood as an abbreviation of the expression "scanning line," but here means "signal . . . in time . . . scanning line"), are the same whereas the phase modulation in the second line is absent, the phase of the subcarrier signal oscillations equaling the reference phase.

To shape a composite signal acting during the time of every scanning line, use is made of all the three signals, i.e., for instance, $E_y$, $E_{R-y}$ and $E_{B-y}$.

To shape a chrominance subcarrier, for example, use is made during the time of one scanning line of the sum in the quadrature of the products of the subcarrier balanced modulation by two signals $E_{R-y}$ and $E_{B-y}$. To shape a subcarrier signal during the time of the following scanning line use is made of the balanced modulation of the subcarrier by the complex voltage equal to $$\sqrt{E^2_{R-y}+E^2_{B-y}}$$

i.e., in the end, to shape the chrominance subcarrier signal during the time of this line use is made of the both color-difference signals. Thus, the amplitude of the modulated subcarrier acting during the time of every scanning line carries information on the color saturation. As to information on the color hue, it may be transmitted either in every other line (interlace phase-difference modulation), or in every line (variants of the line-wise phase-difference modulation). Thus mathematical expressions for the composite color television signal in adjacent lines can be written as:

1st line:

$$E_1-E_{y_1}+E_{S_1}=E_{y_1}+K\sqrt{K_1{}^2E^2_{R-y}+K_2{}^2E^2_{B-y}}$$

$$\sin\left(\omega_o t+\arctan\frac{K_1E_{R-y}}{K_2E_{B-y}}\right)=E_{y_1}+A\cdot\sin(\omega_o t+\varphi)$$

2nd line:

$$E_2=E_{y_2}+E_{S_2}=E_{y_.}+K\sqrt{K_1{}^2E^2_{R-y}+K_2{}^2E_{B-y}}$$

$$\cdot\sin\omega_o t=E_{y_2}+A\cdot\sin\omega_o t$$

where $E_1$ and $E_2$ are signals in the first and second successively transmitted lines, respectively;

$E_{y_1}$ and $E_{y_2}$ are luminance signals in the first and second successively transmitted lines, respectively;

$E_{s_1}$ and $E_{s_2}$ are chrominance subcarrier signals with a phase modulation and with a constant phase in the first and second successively transmitted lines, respectively;

$k$, $k_1$ and $k_2$ are constant coefficients;

$\omega_o$ is the angular frequency of the subcarrier;

$$A=K\sqrt{K_1{}^2E_{R-y}+K_2{}^2E^2_{B-y}}$$

is the amplitude and $$\varphi=\arctan\frac{K_1E_{R-y}}{K_2E_{B-y}}$$

is the phase of the chrominance subcarrier signal.

The interlacing phase-difference modulation can also be effected in a different manner when the phase modulation is preserved in both lines, for example, if the expression for the chrominance subcarrier signal in the first line is $$A\cdot\sin\left(\omega_o t+\frac{\varphi}{2}\right)$$

then the expression for the signal in the second line (the chrominance subcarrier signal) should be $$A\cdot\sin\left(\omega_o t-\frac{\varphi}{2}+\pi\frac{m-1}{\Omega}\right)$$

where $\Omega$ is the frequency of the modulating signal and $m$ is an arbitrary value.

The presence of the term $$\pi\frac{m-1}{\Omega}$$

signifies, that the balanced modulation in the second line is effected by means of a unipolar signal, i.e., that the subcarrier is always in the phase $$2m\left(180°-\frac{\varphi}{2}\right)$$

in contradistinction to the first line, where, in case of using a bipolar signal, the phase of the subcarrier is equal either to $$2m\left(180°+\frac{\varphi}{2}\right)$$

(a positive half-period of the modulating signal), or to $$(2m+1)\left(180°+\frac{\varphi}{2}\right)$$

(a negative half-period of the modulating signal).

The use of an interlacing phase-difference modulation with a phase $$+\frac{\varphi}{2} \text{ and } -\frac{\varphi}{2}$$

is, thus, equivalent to the use of the modulation where phases $\varphi$ and 0 are transmitted. The differences may become apparent only in the subcarrier pattern on the screen of a monochrome receiver in case of compatible reception. At the same time the use of phases $$+\frac{\varphi}{2} \text{ and } -\frac{\varphi}{2} \text{ or } \varphi \text{ and } 0$$

will not bring about any changes in the structure of decoding circuits of the color television receiver.

The equation for the chrominance subcarrier signal during the time of the third and other odd-numbered lines will be the same as for the first line, whereas the equation for the subcarrier signal during the time of the fourth and other even-numbered lines will be the same as for the second line. As to the value of the coefficient $m$ used in the expression $$-\pi\frac{m-1}{\Omega}$$

we can give the follonwing clarifications:

The expression $$\pi\frac{m-1}{\Omega}$$

used in the expression $$A\cdot\sin\left(\omega_o t-\frac{l}{2}+\pi\frac{m-1}{\Omega}\right)$$

above conventionally shows as is stated above that in the course of transition from the negative half period to the positive half-period of the modulating signal of the frequency $\Omega$ the chrominance subcarrier signal in the second line is not phase-shifted through 180°, the fraction $$\frac{m-1}{\Omega}$$

is not a physical value having dimensions but is only a number (a number of a period). Accordingly, during the positive (odd-numbered) and negative (even-numbered) half periods added to the phase of the chrominance signal $$-\frac{l}{2} \text{ is } 2\pi+0$$

(an odd-numbered half period), whereas during the negative half-period (even numbered one) added to the phase of the chrominance signal $$-\frac{l}{2}+180°$$

is $2\pi+180°$ as a result of which $$-\frac{l}{2}+2\pi$$

is obtained again.

This form of conventiional designation is not appropriate and it might be possible to substitute the above expressions with the following ones:

$$E_{S_1}=A_{\sin}\left[\omega_o t+\frac{l(t)}{2}\right]$$

and $$E_{S_2}=A_{\sin}\left[\omega_o t-\frac{l(t)}{2}\right]$$

having in view that during the positive half-period of the modulating signal of the frequency $$\frac{l(t)}{2}=\frac{l}{2}$$

and during the negative half-period $-l(t)=l+180°$;

$$\frac{l(t)}{2}=\frac{l}{2}+90°$$

and, respectively, the phase difference between $E_{S_1}$ and $E_{S_2}$ during the positive half period will be $$\frac{l}{2}-\left(-\frac{l}{2}\right)-l$$

whereas during the negative half period it will be $$-\frac{l}{2}+90°-\left(-\frac{l}{2}-90°\right)=l+180°$$

In the second method a line-wise phase-difference balanced quadrature modulation is employed, which is effected in such a manner that the phase of the subcarrier in each line of the image being transmitted is equal to the algebraic sum of the subcarrier phases in all the preceding lines of a given field. The phases of the subcarrier in the lines can be summed either with an additional phase reversal from line to line or without it. The value of the phase modulation $\varphi_{n-1}(t)$ along one line $(n-1)$ is then used as a "reference signal" for shaping (i.e., for phase modulation) of the subcarrier $\varphi_n(t)$ in the following $(n$—th) line.

In case of an alternating line-wise modulation of the subcarrier the expression for signal $E_S$ can be written as—

1st line: $E_{S_1}=A_1\cdot\sin(\omega_o t+\varphi_1)$

2nd line: $E_{S_2}=A_2\cdot\sin\left(\omega_o t+\varphi_1-\varphi_2+\pi\frac{m-1}{\Omega}\right)$ 3rd line: $E_{S_3}=A_3\cdot\sin(\omega_o t+\varphi_1-\varphi_2+\varphi_3)$ 4th line: $E_{S_4}=A_4\cdot\sin\left(\omega_o t+\varphi_1-\varphi_2+\varphi_3-\varphi_4+\pi\frac{m-1}{\Omega}\right)$

* * * * *

$n$—th line: $E_{S_n}=$ $$A_n\cdot\sin\left[\omega_o t+\sum_{i=0}^{n}\varphi_{2i+1}-\sum_{i=0}^{n}\varphi_{2i}-\pi\frac{m-1}{\Omega}(i-1)\right]$$

where $i$ is the line number;

$$A_i=\sqrt{K_1^2(E^2_{R-Y})_i+K_1^2(E^2_{B-Y})_i}$$

is the amplitude modulation of the chrominance subcarrier in this line, $$\varphi_i=\text{arcton}\frac{K_1(E^2_{R-Y})_i}{K_2(E^2_{B-Y})_i}$$

is the phase modulation of the chrominance subcarrier in this line;

$$\pi\frac{m-1}{\Omega}(i-1)$$

is the term signifying that in each even-numbered line there is transmitted a signal, which is a result of the balanced modulation of the subcarrier by means of a unipolar signal (i.e., that there is no phase reversal through 180° at a frequency Ω of the modulating signal).

For shaping the first line of each field there is used a subcarrier with the zero phase modulation.

Thus, when transmitting images where the chrominance (color hue) of the scene in the direction perpendicular to the scanning lines does not vary, the signal in case of the altenrating line-wise phase-difference modulation of the subcarrier will not differ from the signal obtained with the use of the time interlacing phase-difference modulation with a constant phase in one line. Indeed, if $\varphi_i=\varphi_{i+1}$, then their difference $\varphi_i-\varphi_{i+1}=0$, whereas in those portions of the image where color transitions take place, i.e., when $\varphi_i\neq\varphi_{i+1}$ (in the direction perpendicular to the lines) the difference in colors of the image will be preserved. Therefore the vertical color definition in the image on the receiver screen will be complete and the employment of the signal at the receiving end will not differ from the case of transmitting signal with the interlacing phase-difference modulation of the chrominance subcarrier (the structure of the chrominance circiuts in the receiver remaining the same). In the case when the interlacing phase-difference modulation of the subcarrier is effected without the additional reversal of the phase modulation sign from line to line, the expressions for the chrominance subcarrier signal may be written as—

1st line: $E_{S_1}=A_1\cdot\sin(\omega_0 t+\varphi_1)$

2nd line: $E_{S_2}=A_2\cdot\sin\left(\omega_0 t+\varphi_1+\varphi_2+\pi\frac{m-1}{\Omega}\right)$ 3rd line: $E_{S_3}=A_3\cdot\sin(\omega_0 t+\varphi_1+\varphi_2+\varphi_3)$ 4th line: $E_{S_4}=A_4\cdot\sin\left(\omega_0 t+\varphi_1+\varphi_2+\varphi_3+\pi\frac{m-1}{\Omega}\right)$

* * * * *

$n$—th line: $E_{S_n}=A_n\cdot\sin\left[\omega_0 t+\sum_{i=0}^{n}\varphi_i+\pi\frac{m-1}{\Omega}(i-1)\right]$ The absence of the additional phase modulatiion of the subcarrier (i.e., of the sign reveersal before $\varphi_1$) effected from line to line makes it possible to simplify somewhat the use of signals in the receiver, since then there is no need in removing this additional phase modulation.

For shaping the first line of each field a subcarrier with a zero phase modulation is used.

Given below is a description of exemplary embodiments of the invention to be had in conjunction with the accompanying drawings, in which:

FIGS. 1*a, b, c, d* shows vector diagrams of chrominance subcarrier signals in case of using time interlacing phasdifference modulation of the subcarrier (with a constant phase in one of the lines);

FIGS. 2*a, b, c, d* shows vector diagrams of chrominance subcarrier signals in case of using time interlacing phase-difference modulation of the subcarrier (with a "half" phase modulation);

FIG. 3*a, b, c, d, e, f, g, h, i, j* shows vector diagrams of chrominance subcarrier signals in case of using a line-wise alternating phase-difference modulation;

FIG. 4*a, b, c, d, e, f, g, h, i, j* shows vector diagrams of chrominance subcarrier signals without an additional reversal of the phase modulation sign from line to line;

Figure 8A:
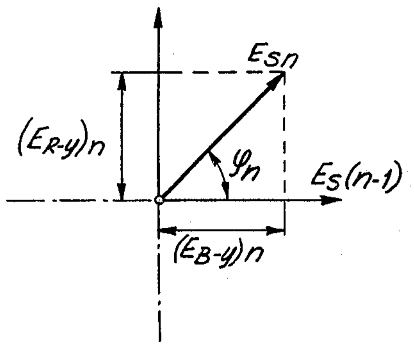
Figure 9A:
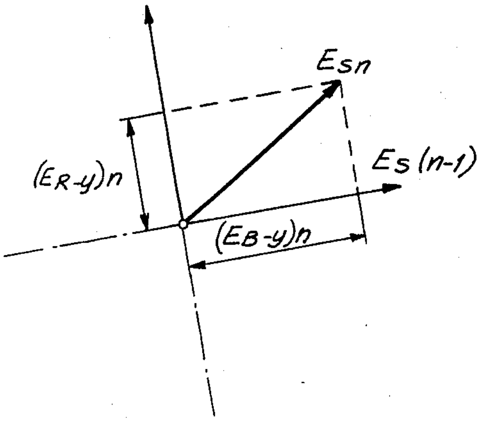
Figure 10:
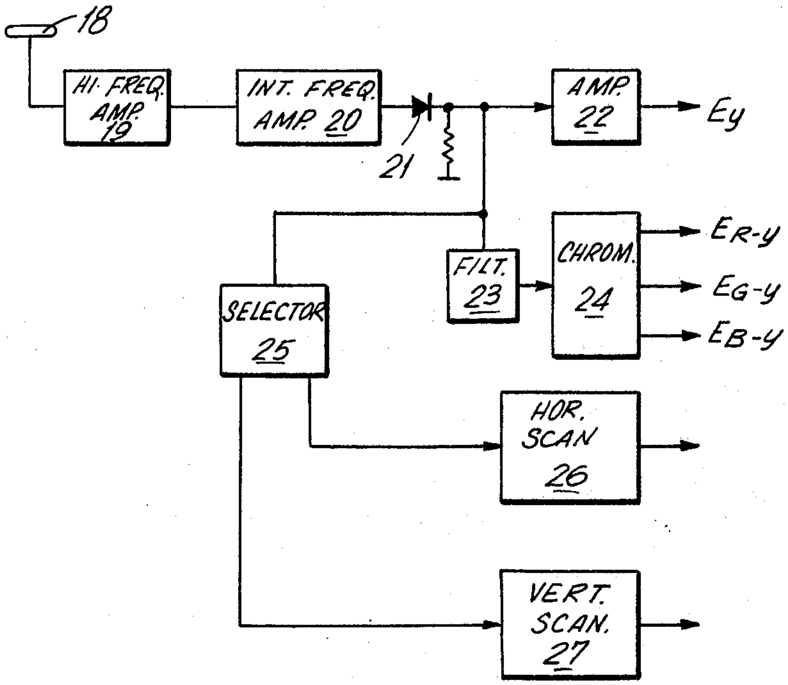
Figure 11:
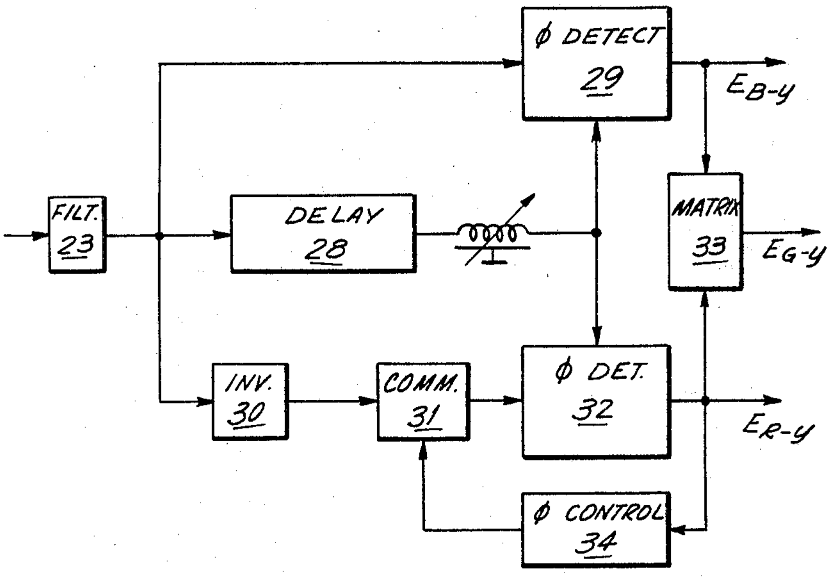
Figure 12:
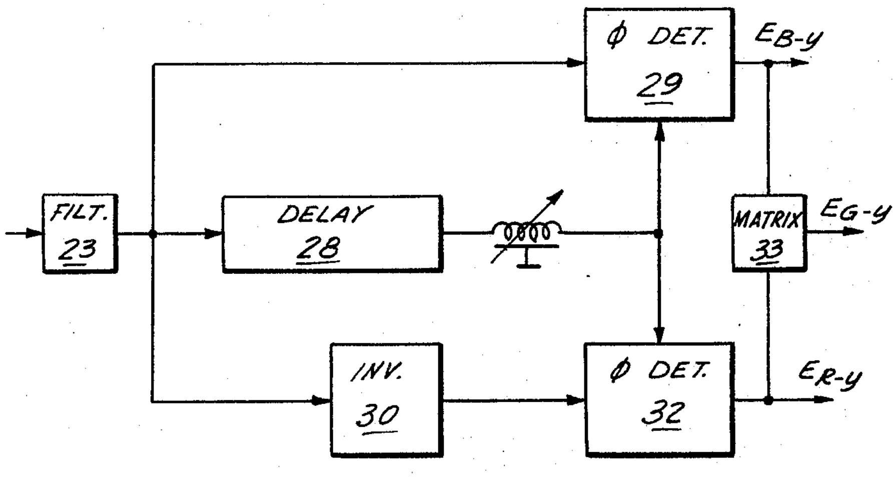

FIG. 8*a, b* shows vector diagrams of decoding chrominance subcarrier signals in case of time interlacing phase-difference modulation with a constant phase in one of the lines transmitted in succession;

FIG. 9*a, b* shows vector diagrams of decoding chrominance subcarrier signals in case of a line-wise phase-difference modulation without an additional reversal of the phase modulation sign from line to line;

FIG. 10 shows a simplified block diagram of a color television receiver;

FIG. 11 shows a simplified block diagram of chrominance circuits in the receiver for decoding color television signals in case of using time interlacing phase-difference and a line-wise alternating phase-difference modulation of the subcarrier;

FIG. 12 shows a simplified block diagram of chrominance circuits in the receiver for decoding color television signals in case of using a line-wise phase-difference modulation of the subcarrier without an additional reversal of the phase modulation sign from line to line.

Figure 1A:
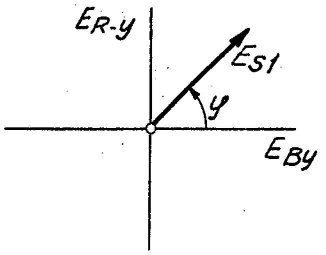
Figure 1B:
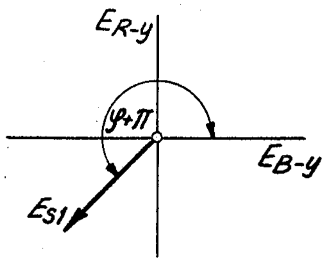
Figure 2A:
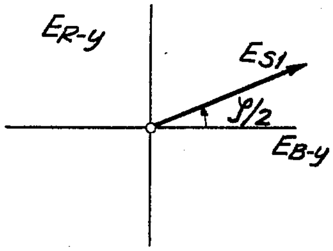
Figure 2B:
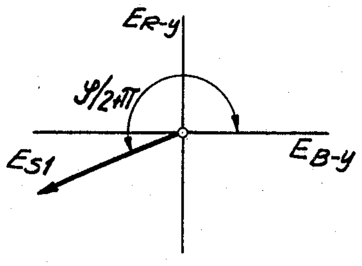
Figure 2C:
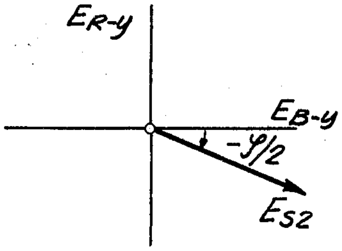
Figure 2D:
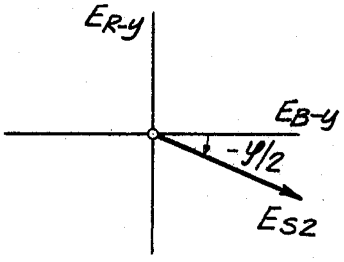

Shown in FIG. 1*a, b, c, d* are vector diagrams of chrominance subcarrier signals in the first and second lines during the negative and positive half-periods of the modulating signal with the use of time interlacing phase-difference modulation of the subcarrier with a constant phase in one line; shown in FIG. 2*a, b, c, d* are vector diagrams for the time interlacing phase-difference modulation with a "half" phase angle. While with the reversal of polarity of the modulating signal from positive to negative one (FIGS. 1*a, b,* 2*a, b*), the phase of the subcarrier in the first line changes through 180° in accordance with the expression for the signal of the first line $$E_{s_1}=A_1\sin(\omega_0 t+\varphi)\text{ or }E_{s_1}=A_1\sin\left(\omega_0 t+\frac{\varphi}{2}\right)$$

Figure 1C:
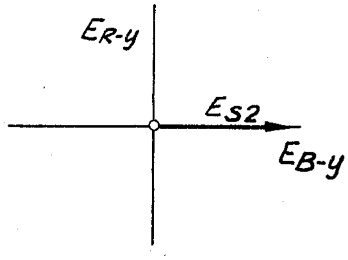
Figure 1D:
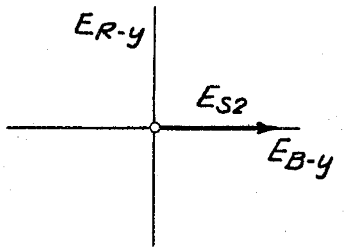

There will be no such phase reversal in the second line, (FIGS. 1*c, d,* 2*c, d*), since the phase of the subcarrier along the line is either constant by virtue of the expression $$E_{s_2}=A_2\cdot\sin\omega_0 t$$

or equal to $$-\frac{\varphi}{2}+\frac{\pi}{2}(m-1)$$

in accordance with the expression $$E_{s_2}=A_2\cdot\sin\left(\omega_0 t-\frac{\varphi}{2}+\pi\frac{m-1}{\Omega}\right)$$

Hence, the phase difference of the subcarrier in the first and second lines during the positive half-period of the modulating signal will be equal to $$\varphi\text{ or to }\frac{\varphi_1+\varphi_2}{2}$$

and during the negative half-period of the modulating signal, to $$\varphi+\pi \text{ or to } \frac{\varphi_1+\varphi_2}{2}+\pi$$

respectively.

Figure 3A:
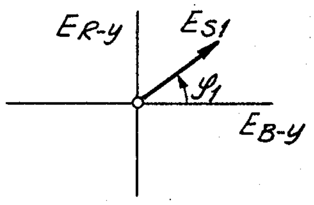
Figure 3B:
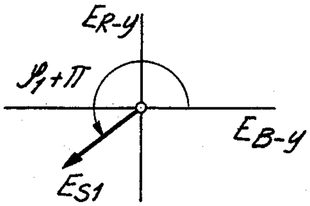

Given in FIG. 3*a, b, c, d, e, f, g, h, i, j* are vector diagrams of chrominance subcarrier signals in case of a line-wise alternating phase-difference modulation also during positive and negative half-periods of the modulating signal in five lines transmitted in succession. By way of example, a case has been chosen when $\varphi_1=\varphi_2$, $\varphi_2\neq\varphi_3$, $\varphi_3\neq\varphi_4$ and $\varphi_5=\varphi_4$.

Figure 3C:
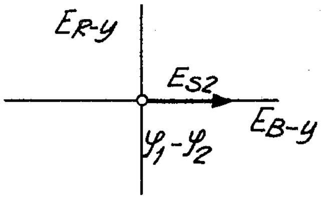
Figure 3D:
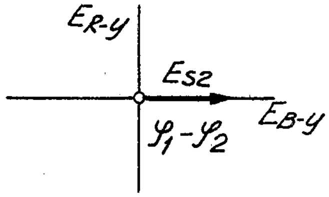
Figure 3E:
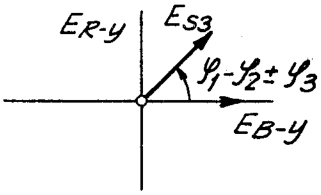
Figure 3F:
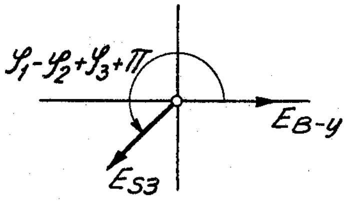
Figure 3G:
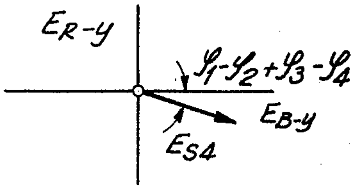
Figure 3H:
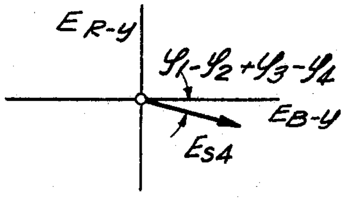
Figure 3I:
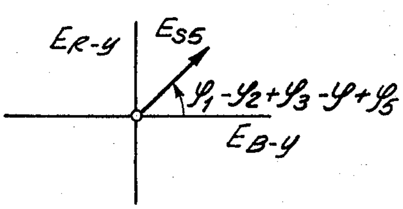
Figure 3J:
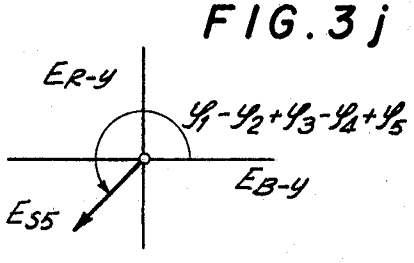

The expression for the chrominance subcarrier signal in each line $E_{s_1}$ (FIG. 3*a, b*), $E_{s_2}$ (FIG. 3*c, d*), $E_{s_3}$ (FIG. 3*e, f*), $E_{s_4}$ (FIG. 3*g, h*) and $E_{s_5}$ (FIG. 3*i, j*) takes the form $$E_{s_n}=A_n\cdot\sin\left[\omega_0t+\sum_{i=0}^{n}\varphi_{2i+1}-\sum_{i=0}^{n}\varphi_{2i}+\pi\frac{m-1}{\Omega}(i-1)\right]$$

From the drawings and the expression given above it can be seen that the phases of the subcarrier signals $E_{s_1}$, $E_{s_3}$ and $E_{s_5}$ in positive and negative half-periods are different by 180° while the phases of signals $E_{s_2}$ and $E_{s_4}$ remain unchanged.

Figure 4A:
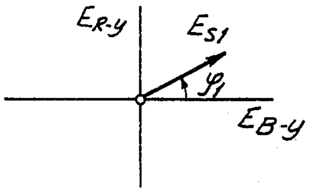
Figure 4B:
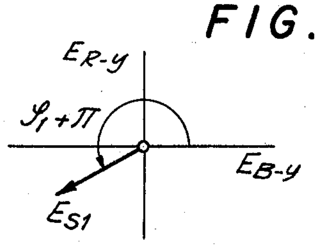

Given in FIG. 4*a, b, c, d, e, f, g, h, i, j* are corresponding vector diagrams of the chrominance subcarrier signals in five lines for a positive and a negative half-periods of the modulating signal.

Figure 4C:
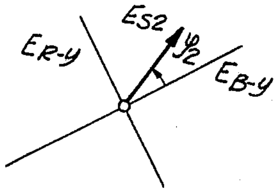
Figure 4D:
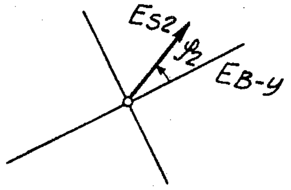
Figure 4E:
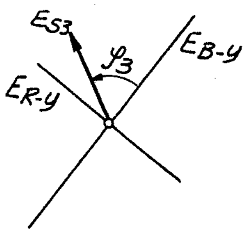
Figure 4F:
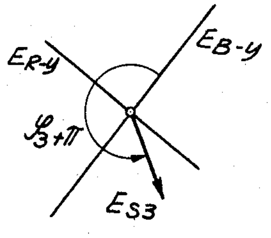
Figure 4G:
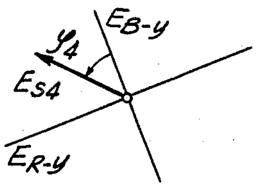
Figure 4H:
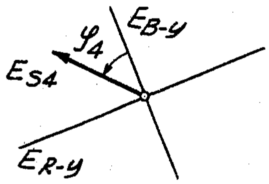
Figure 4I:
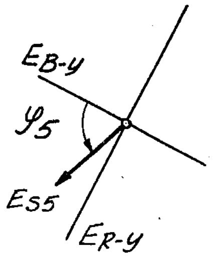
Figure 4J:
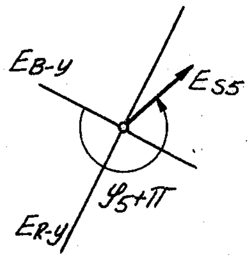

The expression for the chrominance subcarrier signal in each line $E_{s_1}$ (FIG. 4*a, b*), $E_{s_2}$ (FIG. 4*c, d*), $E_{s_3}$ (FIG. 4*e, f*), $E_{s_4}$ (FIG. 4*g, h*) and $E_{s_5}$ (FIG. 4*i, j*) for the case of a line-wise phase-difference modulation without an additional reversal of the phase modulation sign from line to line is of the form $$E_{s_n}=A_n\cdot\sin\left[\omega_0t+\sum_{i=0}^{n}\varphi_i-\pi\frac{m-1}{\Omega}(i-1)\right]$$

As a reference subcarrier (reference encoding axes) for shaping the chrominance signal in each subsequent line there is used the phase of the chrominance subcarrier signal in the preceding line.

Therefore in the drawings the axes of coordinates in each subsequent line are turned through an angle, equal to the phase of the chrominance signal in the preceding line.

Figure 5:
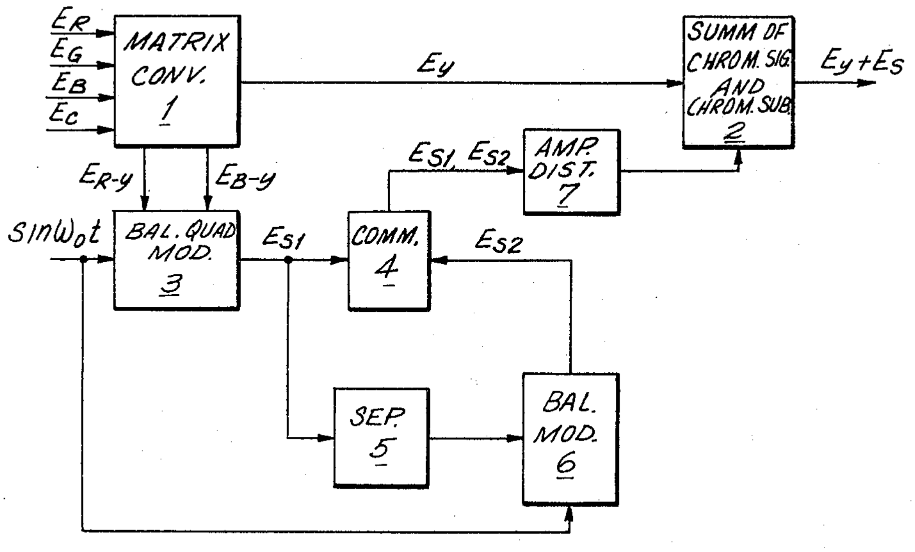
FIG. 5 shows a simplified block diagram of the encoding device of the transmitter of the system for shaping composite color television signals with the use of time interlacing phase-difference modulation of the subcarrier (with a constant phase of the subcarrier in the first of the lines transmitted in succession)

Shown in FIG. 5 is a simplified block diagram of the decoding device of the transmitter for shaping a composite color television signal with time interlacing phase-difference modulation of the subcarrier (in case of using a constant phase in one of the two lines transmitted in succession).

Color signals $E_R$, $E_B$ and $E_G$ coming from the transmitter of color images, e.g., from a studio transmitting camera, are fed to unit 1 of matrix converters, whereto the necessary impulse signals $E_C$ from the synchronizing generator are also fed. In matrix circuits of the unit 1 three video signals are shaped, luminance signal $E_y$ and two color-difference signals $E_{R-y}$ and $E_{B-y}$, respectively.

From the output of unit 1 luminance signal $E_y$ is fed to unit 2 in which the luminance signal is summed with the chrominance subcarrier signal, and also the amplification and necessary processing of the composite color television signal $E_y+E_s$ are effected, which composite signal is then fed to the television radio transmitter. From the output of the unit 1 color-difference signals $E_{R-y}$ and $E_{B-y}$ come to unit 3 of balanced quadrature modulation, whereto the voltage of the reference subcarrier with angular frequency $\omega_0$ is also fed. In the unit 3 there is shaped quadrature-modulated chrominance signal $E_{s1}=A_1\cdot\sin(\omega_0t+\varphi)$ by summing in quadrature two balance-modulated voltages $K_1E_{R-y}\cdot\cos\omega_0t$ and $K_2E_{B-y}\cdot\sin\omega_0t$. From the output of the unit 3 the signal $E_{s_1}$ is fed to the inputs of commutator 4 and of unit 5 in which the envelope of the quadrature-modulated voltage of $E_{s_1}$ is separated, e.g., by means of amplitude detection.

The voltage from the output of the unit 5 equal to $$A=K\sqrt{K_1^2E_{R-y}^2+K_2^2E_{B-y}^2}$$

is fed to balanced modulator 6, whereto, as well as in case of the unit 3 of balanced quadrature modulation, there is also fed the reference subcarrier voltage $\sin\omega_0t$. The output signal from the balanced modulator 6, equal to $$E_{s2}=A_2\cdot\sin\omega_0t$$

is applied to the second input of the commutator 4, from whose output signals $E_{s_1}$ or $E_{s_2}$ are taken alternately in an interlacing manner. These two successive signals from the output of the commutator 4 are fed to unit 7 of the amplitude pre-distorter, whose output voltage, proportional to $\sqrt{A}$ is fed to the unit 2 to be summed with signal $E_y$, i.e., for shaping a composite color television signal.

During the field blanking interval in the complex of the composite color television signal there can be transmitted additional signals in the form of modulated or non-modulated subcarrier burst during several lines (these additional signals being shaped within the $E_{s_1}$ and $E_{s_2}$ signal complexes). These additional signals can be used in the receiver for some auxiliary purposes, such as for controlling the initial state (phase) of the commutator and the operation of the automatic chrominance adjustment system. In this case the subcarrier bursts in the $E_{s_1}$ complex should have the phase of 90° and in the $E_{s_2}$ complex their phase should be equal to the reference one (that is, to "zero").

Figure 6:
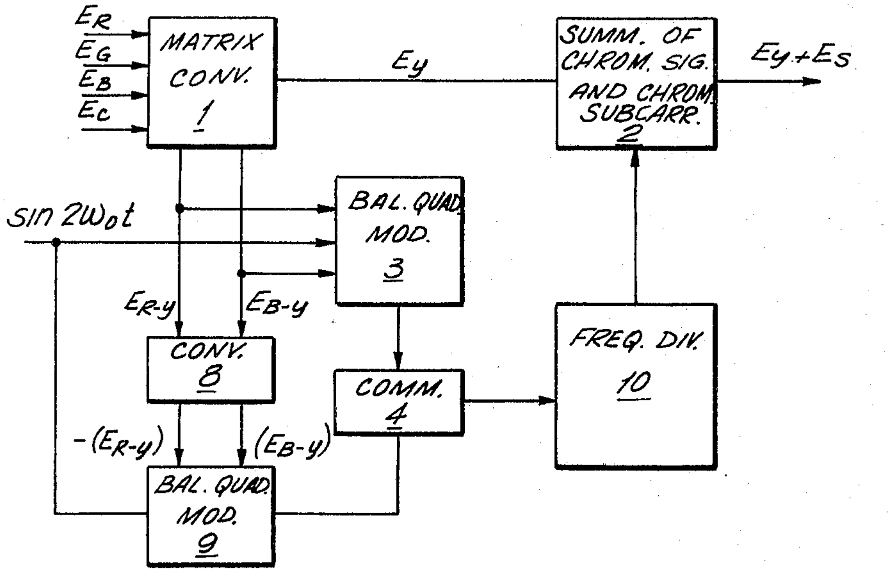
FIG. 6 shows a simplified block diagram of the encoding device of the transmitter of the system for shaping composite color television signals with the use of time interlacing phase-difference modulation of the subcarrier (with a "half" phase modulation)

A simplified block diagram of the encoding device for shaping composite color television signals with the time interlacing phase-difference modulation of the subcarrier in case of using a "half" phase modulation, is shown in FIG. 6.

Similar to the case of the block diagram shown in FIG. 5, signals $E_R$, $E_B$, $E_G$ and impulse signals $E_C$ from the synchronizing generator are fed to unit 1 of matrix converters and from the output of the unit 1 signals $E_y$ are fed to unit 2 of summation and color-difference signals are fed to unit 3 of balanced quadrature modulation. But, in contradistinction to the block diagram of FIG. 5, color-difference signals $E_{R-y}$ and $E_{B-y}$ are fed also to unit 8, in which these signals are converted into unipolar ones, so that voltages at the outputs of the unit 8 are proportional to $E_{R-y}$ and $E_{B-y}$, respectively. These modulus voltages are fed to an additional unit 9 of balanced quadrature modulation, whose circuit is quite similar to that of the unit 3. To these two units there is applied a voltage of the reference subcarrier with the angular frequency $2\omega_0$. Therefore in the unit 3 there is shaped a signal $$E_{s_1}=A\cdot\sin(2\omega_0+\varphi)$$

due to the summation in quadrature of balance-modulated voltages $$K_1E_{R-y}\cos 2\omega_0t \text{ and } K_2E_{B-y}\cdot\sin 2\omega_0t$$

and in the unit 9 there is shaped a signal $$E_{S_2}=A_2\cdot\sin\left(2\omega_0t-\frac{\varphi}{2}+\pi\frac{m-1}{\Omega}\right)$$

due to the summation in quadrature of voltages $$-K_1/E_{R-y}/\cdot\cos 2\omega_0t \text{ and } K_2/E_{B-y}/\cdot\sin 2\omega_0t$$

From the outputs of the units 3 and 9 the signal are fed to the inputs of commutator 4, at whose output there appear either signal $E_{s_1}$ or signal $E_{s_2}$ according to the succession of the lines. This sequence of signals comes to unit 70 of frequency division from the output of which chrominance subcarrier voltages $$E_{S_1}=\sqrt{A_1}\cdot\sin\left(\omega_0 t+\frac{\varphi}{2}\right)$$

or $$E_{S_2}=\sqrt{A_2}\cdot\sin\left(\omega_0 t-\frac{\varphi}{2}+\pi\frac{m-1}{\Omega}\right)$$

are fed to the unit 2 where, being summed with signal $E_y$ they form a composite color television signal which, after adequate processing and amplification, is fed to the television radio transmitter.

In this case also during the field blanking interval there can be transmitted additional auxiliary signals in the form of several lines of either modulated or non-modulated subcarrier, which can be used in the receiving device both for phasing the commutator and for controlling the circuit of the automatic control and adjustment systems of the chrominance channel.

Therefore, when transmitting color television signals with the time interlacing phase-difference modulation of the subcarrier, in each line there is transmitted information on both color-difference signal $E_{R-y}$ and $E_{B-y}$. On color transitions, however, whose boundary coincides with the direction of the line scanning, part of the information appears to be transmitted in an integrated form, which results in the deterioration of the vertical color definition.

Figure 7:
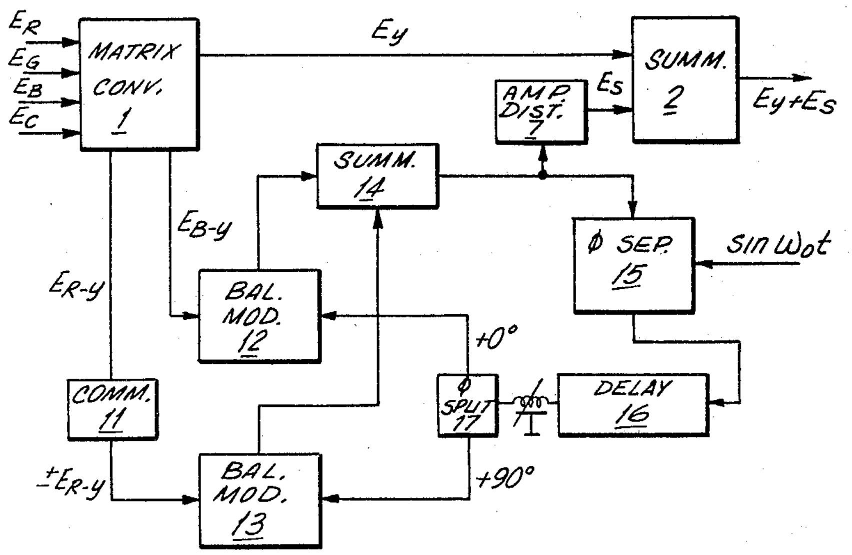
FIG. 7 shows a simplified block diagram of the encoding device of the transmitter of the system for shaping composite color television signals with the use of a line-wise alternating phase-difference modulation of the subcarrier.

A block diagram of the device for shaping a composite color television signal with a line-wise alternating phase-difference modulation of the subcarrier is shown in FIG. 7.

Chrominance signals $E_R$, $E_B$, $E_G$ from the synchronizing generator are fed to unit 1 of matrix converters, in which three video signals are shaped, viz., luminance signal $E_y$ and two color-difference signals, say, $E_{R-y}$ and $E_{B-y}$. The luminance signal $E_y$ from the output of the unit 1 is fed to the unit 2 of summation where the shaping of the composite color television signal (by summing the signal $E_y$ with the chrominance subcarrier signal $E_s$), its amplification and the necessary processing prior to feeding to the television transmitter are effected.

The color-difference signal $E_{B-y}$ from the output of the unit 1 is fed to balanced modulator 12, and the signal $E_{R-y}$ through commutator 11 which changes its polarity from line to line, is fed to balanced modulator 13. The output voltages of the chrominance subcarrier from balanced modulators 12 and 13 equal in their amplitude to $$K_2E_{B-y} \text{ and } \pm K_1E_{R-y}$$

respectively, are fed to unit 14 of summation, at whose output there appears the voltage of the chrominance subcarrier signal $E_s$, proportional to the quadrature sum of voltages from the balanced modulators 12 and 13.

The amplitude of the signal $E_s$ is equal to $$A=K\sqrt{K_1^2E^2_{R-y}+K_2^2E^2_{B-y}}$$

the voltage of the modulated subcarrier form the output of the unit 14 of summation is fed in parallel to two units, namely to unit 7 of the amplitude pre-distorter (pre-emphasis filter) in accordance with the square root law and to phase-separation unit 15. From the output of the unit 7 of the amplitude pre-distorter the modulated chrominance subcarrier signal is fed to the unit 2 of shaping a composite color television signal equal to $$E_y+E_s$$

In the phase-separation unit 15 suppression of the amplitude modulation of the chrominance subcarrier signal is effected. At the other input of the unit 15 the voltage of the reference subcarrier sin $\omega_0 t$ is fed.

For suppressing the amplitude modulation there can be used, e.g., a self-exciting oscillator with a weak feedback, which is pulled-in by the oscillations of the input signal (chrominance subcarrier). At the output of the unit 15 there is obtained a subcarrier voltage with a constant amplitude but modulated in phase in the same way as the input chrominance subcarrier signal (i.e., the voltage is in phase with the quadrature-modulated signal at the input). If the amplitude of the input quadrature modulated voltage is equal to zero, the phase of the subcarrier voltage at the output of the unit 7 is also equal to "zero" (i.e., to the phase of the reference subcarrier sin $\omega_0 t$.

Therefore, when transmitting chrominance signal $$s_n=A_1\cdot\sin\left(\omega_0 t+\sum_{i=0}^{n}\varphi_{2i-1}-\sum_{i=1}^{n}\varphi_{2i}\right)$$

the voltage which will appear at the output of the unit 15 may be written as $$U_{output}=\sin\left(\omega_0 t+\sum_{i=0}^{n}\varphi_{2i-1}-\sum\varphi_{2i}\right)\text{ with } A\neq 0$$

or $$U_{output}=\sin\omega_0 t \text{ with } A=O$$

This voltage, delayed for one line time by means of an ultrasonic delay line 16, is fed to a wideband phase splitter 17 from whose outputs two voltages of the subcarrier modulated in phase according to the same law shifted by 90° with respect to each other, are fed to the balanced modulators 12 and 13 as a "reference" voltage for shaping the quadrature-modulated voltage of the chrominance subcarrier (chrominance signal) in the subsequent line.

The elements and the mode of operation of the block-diagram of a device for shaping a composite color television signal with the line-wise phase-difference modulation of the subcarrier without an additional reversal of the phase modulation sign from line to line (the device not being shown in the drawings) do not differ from the respective elements and their mode of operation in the block diagram of the device shown in FIG. 7. The only difference between these block diagrams is the absence of the commutator 11 which in the block diagram of FIG. 7 serves for effecting the alternating phase modulation of the subcarrier. In the shaped composite color television signal with the line-wise phase-difference modulation of the subcarrier, as well as in the case of the time interlacing phase-difference modulation, during the field blanking interval there can be transmitted additional auxiliary signals in the form of bursts of modulated or non-modulated subcarrier.

Since for decoding chrominance subcarrier signals shaped in accordance with the herein proposed method it is necessary to determine the difference between the phases of the subcarrier transmitter in the successive lines, the principle of using said signals in the receiving device is their matching in time by means of a memory device, e.g., a delay line for one line time.

Thus in the receiving device two chrominance signals are always present, a delayed signal (transmitted during the preceding line) and a nondelayed signal (which is being received at the moment).

Depending on the method of shaping these signals at the transmitting end, their expressions can be written, respectively, as follows:

(I) In case of the time interlacing phase-difference modulation of the subcarrier, (a) With a "constant phase":

during the $n$—th line $$\sqrt{A_{n-1}}\cdot\sin(\omega_0 t+\varphi_{n-1})\text{—delayed signal}$$

$$\sqrt{A_n}\cdot\sin\omega_0 t\text{—nondelayed signal}$$

during the transmission of the $(n+1)$—th line $\sqrt{A_n} \cdot \sin\, \omega_o t$—delayed signal $\sqrt{A_{n-1}} \cdot \sin\, (\omega_o t + \varphi_{n+1})$—nondelayed signal (b) With a "half" phase modulation during the $n$—th line $$\sqrt{A_{n-1}} \cdot \sin\left(\omega_o t + \frac{\varphi_{n+1}}{2}\right) \text{—delayed signal}$$

$$\sqrt{A_n} \cdot \sin\left(\omega_o t - \frac{\varphi_n}{2} + \pi \frac{m-1}{\Omega}\right) \text{—nondelayed signal}$$

during the $(n+1)$—th line $$\sqrt{A_n} \cdot \sin\left(\omega_o t - \frac{\varphi_n}{2} + \pi \frac{m-1}{\Omega}\right) \text{—delayed signal}$$

$$\sqrt{A_{n+1}} \cdot \sin\left(\omega_o t + \frac{\varphi_{n+1}}{2}\right) \text{—nondelayed signal}$$

(II) In case of the line-wise phase-difference modulation of the subcarrier, (a) Alternating:

during the transmission of the $n$—th line $$E_{S(n-1)} = \sqrt{A_{n-1}} \cdot \sin\left[\omega_o t + \sum_{i=0}^{n-1} \varphi_{2i+1} - \sum_{i=0}^{n} \varphi_{2i} + \pi \frac{m-1}{\Omega}(n-1)\right] \text{—(delayed signal)}$$

$$E_{S_n} = \sqrt{A_n} \cdot \sin\left[\omega_o t + \sum_{i=0}^{n} \varphi_{2i+1} - \sum_{i=0}^{n} \varphi_{2i} + \pi \frac{m-1}{\Omega}(n-1)\right] \text{—(nondelayed signal)}$$

(b) Without the additional commutation of the phase modulation sign from line to line:

during the transmission of the $n$—th line $$E_{S(n-1)} = \sqrt{A_{n-1}} \cdot \sin\left[\omega_o t + \sum_{i=0}^{n-1} \varphi_i + \pi \frac{m-1}{\Omega}(n-2)\right] \text{—(delayed signal)}$$

$$E_{s_n} = \sqrt{A_n} \cdot \sin\left[\omega_o t + \sum_{i=1}^{n} \varphi_i + \pi \frac{m-1}{2}(n-1)\right] \text{—(non-delayed signal}$$

Cited above is an expression used for the signal of the chrominance subcarrier during the time of the $n$ scanning line. This expression shows that the phase of the subcarrier will be equal, by its value, to the sum of the instantaneous values of the subcarrier phases radiated at appropriate time moments calculated from the beginning of every preceding scanning line, i.e., disposed in the picture on one straight line perpendicular to the direction of the scanning along the lines.

When multiplying the delayed and nondelayed signals in the phase detector with a 90° shift and without it (the separation of the sine and cosine components of the quadrature modulation) at the loads of the detectors the following video signals are separated:

(I) In case of the interlace phase-difference modulation with a "constant" phase $$A \cdot \cos(-\varphi_{n-1}) = (E_{B-Y}) =_{n-1};$$
$$A \cdot \sin(-\varphi_{n-1}) = -(E_{R-Y})_{n-1};$$
$$A \cdot \cos\varphi_n = (E_{B-Y})_n;\ A \cdot \sin\varphi_n (E_{R-Y})_n;$$

(II) In case of the interlace phase-difference modulation with a "half" phase $$A \cdot \cos\left(\frac{\varphi_{n-2}}{2} + \frac{\varphi_n}{2}\right) = \frac{(E_{B-y})_{n-1} + (E_{B-y})_n}{2}$$

$$A \cdot \sin\left(\frac{\varphi_{n-1}}{2} + \frac{\varphi_n}{2}\right) = \frac{(E_{R-y})_{n-1} + (E_{R-y})_n}{2}$$

$$A \cdot \cos\left(-\frac{\varphi_n}{2} - \frac{\varphi_{n-1}}{2}\right) = \frac{(E_{B-y})_n + (E_{B-y})_{n+1}}{2}$$

$$A \cdot \sin\left(-\frac{\varphi_n}{2} - \frac{\varphi_{n+1}}{2}\right) = \frac{(E_{R-y}) + (E_{R-y})_{n+1}}{2}$$

(III) In case of the line-wise alternating phase-difference modulation of the subcarrier $$A \cdot \cos(-\varphi_{n-1}) = (E_{B-Y}) =_{n-1};$$
$$A \cdot \sin(-\varphi_{n-1}) = -(E_{R-Y})_{n-1};$$
$$A \cdot \cos\varphi_n = (E_{B-Y})_n;\ A \cdot \sin\varphi_n (E_{R-Y})_n;$$
$$A \cos(-\varphi_{n-1}) = (E_{B-Y})_{n+1},$$
$$A \cdot \sin(-\varphi_{n-1}) = -(E_{R-Y})_{n+1}$$

The alternation of the sign of signal $E_{R-Y}$ (of the sine component of the quadrature modulation) should be accounted for by the fact that the difference of phases between the subcarriers transmitted in the time-adjacent lines in case of the time interlacing and alternating line-wise phase-difference modulations constitutes either a positive angle $\varphi - 0 = \varphi$, or a negative angle $0 - \varphi = \varphi$ (for the case of the "half" phase this will be $\varphi/_2 + \varphi_2 = \varphi$ and $$-\varphi/2 - \varphi/2 = \varphi$$

respectively).

In other words the alternation of the sign of the signal $E_{R-Y}$ is a result of an additional phase modulation of the subcarrier at the transmitting end:

$$\varphi,\ 0,\ \varphi\ \ldots$$

or $$\varphi/2,\ -\varphi/2,\ \varphi/2\ \ldots$$

or $$\varphi_1;\ \varphi_1 - \varphi_2;\ \varphi_1 - \varphi_2 + \varphi_3;\ \varphi_1 - \varphi_2 + \varphi_3 - \varphi_4\ \ldots$$

Therefore, when using thus shaped chrominance subcarrier signals, it is necessary to effect an additional "demodulation" of the signal $E_{R-Y}$ in the receiving device, i.e., a synchronous reversal of its phase (or polarity), e.g., by means of a commutator operating at a line frequency.

In the case of the line-wise phase-difference modula- without the additional reversal of the modulation sign from line to line, when the value of the subcarrier phase may be written for the $n$—the line in the form of the sum $$\sum_{i=0}^{n} \varphi_i$$

there will be no sign alternation in the signal $E_{R-Y}$.

$$A \cdot \sin\left(\sum_{i=0}^{n} \varphi_i - \sum_{i=0}^{n-1} \varphi_i\right) = A \cdot \sin\, \varphi_n = (E_{R-y})_n$$

$$A \cdot \sin\left(\sum_{i=0}^{n+1} \varphi_i - \sum_{i=0}^{n} \varphi_i\right) = A \cdot \sin\, \varphi_{n+1} = (E_{R-y})_{n+1}$$

Vector diagrams of the process of decoding the chrominance subcarrier signals are given in FIGS. 8*a*, *b* and FIGS. 9*a*, *b*. As the "axes of decoding" there are used chrominance subcarrier signal transmitted during the preceding line time interval (delayed signal) with a 90° shift and without it; as a "decoded signal" there is used a nondelayed chrominance subcarrier signal. If, instead of a delayed signal, a nondelayed signal is used for the "axes of decoding," the results will be only in the reversal of the sign of the color-difference signal $E_{R-Y}$ being separated.

Figure 8B:
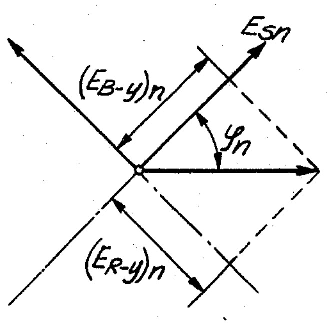

The process of decoding for cases when using signals with the time interlacing phase-difference modulation with a "constant" and "half" phase, as well as with the line-wise alternating phase-difference modulation being similar, given in FIGS. 8*a*, *b* are diagrams of decoding only for one of these versions, namely, for the time interlacing phase-difference modulation with a "constant" phase. The diagram, shown in FIG. 8*a* pertains to the time demodulation of the $n$—th line, when the delayed signal $$E_{s(n-1)} = A \cdot \sin\omega_0 t$$

and the diagram shown in FIG. 8*b* pertains to the time of demodulation of the signal in the $(n+1)$—th line when the signal $E_{sn}=A\cdot\sin(\omega_0 t+\varphi_n)$ is delayed and the signal $E_{s(n+1)}=A\cdot\sin\omega_0 t$ is being received.

Figure 9B:
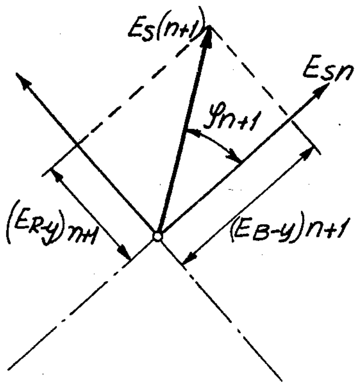

Shown in FIGS. 9*a, b* are diagrams for the case of the line-wise phase-difference modulation of the subcarrier without the additional reversal of the phase modulation sign from line to line. The diagram of FIG. 9*a* pertains to the time, of decoding the $n$—th line when the signal $$E_{s(n-1)}=A\cdot\sin\left(\omega_0 t+\sum_{i=0}^{n-1}\varphi_i\right)$$

is delayed, and the diagram presented in FIG. 9*b* pertains to the time of decoding the $(n+1)$—th line when the signal $$E_{sn}=A\cdot\sin\left(\omega_0 t+\sum_{i=0}^{n}\varphi_i\right)$$

is delayed.

In the receiver the signal from antenna 18 (FIG. 10) comes to stages 19 of high frequency amplification and of the converter in the unit adapted for switching over television programs. Then the signal at the intermediate frequency is amplified in an intermediate frequency amplifier 20, and at the load of the first detector 21 there is separated a composite color television signal $E_y+E_s$, which is fed to amplifier 22 of luminance signal $E_y$ and through bandpass filter 23 to chrominance unit 24. From the outputs of the chrominance unit 24 chrominance video signals are taken off, e.g., $E_{R-y}$, $E_{G-y}$ and $E_{B-y}$. These signals, together with the luminance signal $E_y$ are fed, e.g., to a three-gun kinescope or any other reproducing device, controlling the luminance and chrominance of the image on the receiving screen.

The signal, necessary for the synchronization of generators 26 and 27 of horizontal and vertical scanning respectively are obtained from selector 25 of synchronizing pulses.

In FIG. 11 is given a simplified block diagram of circuits for decoding chrominance subcarrier signals in cases when the composite color television signal is transmitted with the use of the time interlacing, as well as of the line-wise alternating phase-difference modulation of the subcarrier.

The voltage of the chrominance subcarrier from the bandpass filter 23 is fed to the inputs of delay line 28, phase detector 29 and wide band phase inverter 30. The chrominance subcarrier signal having been turned in the phase inverter 30 through 90° is fed to commutator 31 in which its phase is turned through 180° at a line frequency. During the period of the first line the signal at the output of the commutator differs from the input signal by 180° with respect to the phase, and during the period of the second line the input and the output signals of the commutator are in phase. The voltage from the output of the commutator 31 is fed to the second phase detector 32. Besides these (nondelayed) signals, to the phase detectors 29 and 32 there is also fed the voltage of the chrominance subcarrier from the output of the delay line 28 (the delayed signal from the preceding line). Due to the multiplication of the delayed and the nondelayed voltages of the chrominance subcarrier in the phase detectors 29 and 32, at the outputs of said detectors there appear color-difference video signals $E_{B-y}$ and $E_{R-y}$, respectively. The third color-difference signal $E_{G-y}$ is obtained in matrix circuit 33 by summing $E_{R-y}$ and $E_{B-y}$ taken in certain proportions and with certain polarities.

The operation of the commutator 31 is controlled by line frequency pulses from the horizontal scanning generator 26 of the receiver. To control the initial position (phase) of the commutator 31, stage 34 can be employed, whereto there comes a pulse arising in the signal $E_{R-y}$ during the frame blanking interval, when in the chrominance signal complex there is transmitted an identification signal in the form of bursts of modulated or non-modulated subcarrier. The same signal can be used for controlling the chrominance control and adjustment system. A simplified block diagram of the chrominance circuits of the receiver, used for receiving color television signals with a line-wise phase-difference modulation of the subcarrier without additional reversal of the phase modulation sign from line to line is shown in FIG. 12. The difference between this block diagram and that shown in FIG. 11 is in the absence of commutator 31 and unit 34 for controlling the initial position of the commutator. Since at the transmitting end there is non additional synchronous phase modulation (commutation) at the line frequency, there is no need of such commutation in the receiving device either. All the other elements of the block diagram of FIG. 12 and functions performed by them are absolutely similar to those of FIG. 11.

What is claimed is:

1. A color television system in which a subcarrier is employed which shares the frequency band of the luminous signal, said system comprising means for shaping chrominance information including a transmitter encoding device; means for transmitting said chrominance information by phase-difference balanced quadrature modulation of the chrominance subcarrier in successive lines in such a way that the amplitude modulations in said successive lines are analogous and the phase modulations are different to produce a chrominance, the phase of the chrominance signals in one of said lines being the reference for shaping the chrominance signal in the other of said lines; means for separating the chrominance information thus transmitted in the receiver by storing the chrominance signal which has arrived in the preceding line, the latter said means including a delay line; and means for detecting the difference between the phases of the delayed and non-delayed chrominance signals.

2. A color television system in which a subcarrier is employed which shares the frequency band of the luminance signal, said system comprising means for shaping chrominance information including a transmitter encoding device; means for the phase-difference modulation of the chrominance subcarrier in successive lines to transmit said chrominance information, as a chrominance signal said phase-difference modulation being effected in a time interlacing manner in such a way that the phase of the chrominance signal in one of the successive lines is constant while the phase in another of said successive lines varies in accordance with the variation of the chrominance of the scene being transmitted; means for separating said chrominance information in the receiver by storing the chrominance signal which has arrived in the preceding line, the latter said means including a delay line; and means for detecting the difference between the phases of the delayed and non-delayed chrominance signals.

3. A color television method in which a subcarrier is employed which shares the frequency band of the luminance signal, said method comprising shaping chrominance information in the encoding device of the transmitter; transmitting said shaped chrominance information by phase-difference modulating the subcarrier in a time interlacing manner in such a way that the phase angles of said subcarrier in successive lines are equal in each moment of time to the half of the phase angle corresponding to the chrominance in a given point of the scene being transmitted, the signs of said phase angles in the successive lines being opposite; separating said chrominance information in the receiver by storing the chrominance signal which has arrived in the preceding line; and detecting the difference of phases of the delayed and nondelayed chrominance signals.

4. A color television method in which a subcarrier is employed which shares the frequency band of the luminance signal, said method comprising shaping encoded chrominance information; transmitting said information by phase-difference modulation the subcarrier in a line-wise manner with an alternating sign of the phase modulation from line to line to produce a chrominance signal such that the value of the phase angle of the chrominance signal in each point of the line is equal to the difference of the algebraic sums of the phase angles in points located on the same vertical line of all odd-numbered and all even-numbered lines of a given field; separating in the receiver of said chrominance information by delaying and storing the chrominance signal which has arrived in the preceding line; and detecting the difference between the phases of the delayed and non-delayed chrominance signals.

5. A color television method in which a subcarrier is employed which shares the frequency band of the luminance signal, said method comprising shaping encoded chrominance information; phase-difference modulating said subcarrier in a line-wise manner so that the instantaneous value of the phase of said subcarrier in each of the two successive lines being transmitted is equal to the algebraic sum of the phase angles of all the points lying on the same vertical line in the preceding lines of a given field plus the phase angle corresponding to the chrominance in a given point of the scene; separating said chrominance information by delaying and storing the chrominance signal which has arrived in the preceding line; and detecting the difference between the phases of the delayed and non-delayed chrominance signals.

6. A color television system in which a subcarrier is employed which shares the frequency band of the luminance signal, said system comprising a transmitter; encoding means in said transmitter adapted to shape chrominance information; means for the phase-difference modulation of the chrominance subcarrier in successive lines in said transmitter to transmit said shaped chrominance information as a chrominance signal such that the amplitude modulations in successive lines are analogous and the phase modulations are different, the phase of the chrominance signals in one of said lines being the reference for shaping the chrominance signal in another of said lines; a receiver including means for separating said chrominance information and a delay line for storing the chrominance signal which has arrived in the preceding line; and a detector of the difference between the phases of the delayed and non-delayed chrominance signals, said detector being coupled to said receiver.

References Cited

UNITED STATES PATENTS 3,213,191 10/1965 De France et al. ---- 178—5.2 X

ROBERT L. GRIFFIN, Primary Examiner

J. C. MARTIN, Assistant Examiner

U.S. Cl. X.R.

325—65; 328—162